Oct. 29, 1974 V. W. RHOADES 3,845,196
FIREFLOOD POLLUTION PREVENTION
Filed Sept. 28, 1973
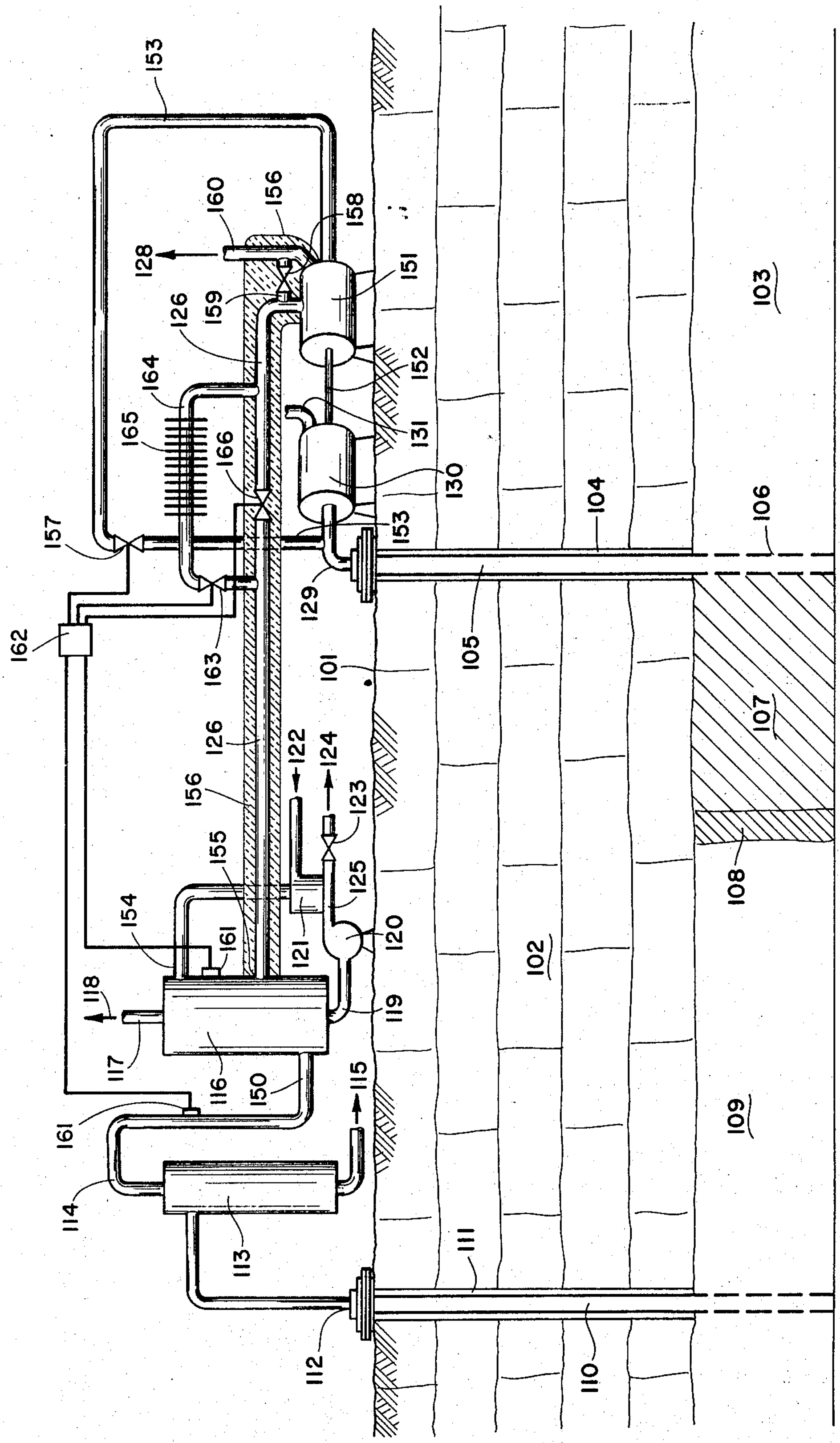

United States Patent Office 3,845,196

Patented Oct. 29, 1974

3,845,196

FIREFLOOD POLLUTION PREVENTION

Vaughan W. Rhoades, Tulsa, Okla., assignor to Cities Service Oil Company, Tulsa, Okla.

Continuation-in-part of application Ser. No. 193,953, Oct. 29, 1971. This application Sept. 28, 1973, Ser. No. 401,761

Int. Cl. C01b *17/04*

U.S. Cl. 423—573 10 Claims

ABSTRACT OF THE DISCLOSURE

An oxygen-containing gas is heated by a combustion engine employed to drive a compressor employed to inject air into a fireflood operation. The heated oxygen-containing gas is contacted with $H_2S$ containing combustion product gas from the underground combustion of the fireflood operation. The oxygen and the $H_2S$ react to form elemental sulphur, which can be recovered. Pollution of the atmosphere with $H_2S$ is mitigated.

This application is a continuation-in-part of application 193,953, filed Oct. 29, 1971, entitled "Prevention of Fireflood Pollution" by Vaughan W. Rhoades, having copendency herewith and now abandoned.

BACKGROUND OF THE INVENTION

Field of the Invention

This invention relates to a process for the removal of $H_2S$ from gases formed by subterranean combustion of hydrocarbons.

BRIEF DESCRIPTION OF THE PRIOR ART

The production of hydrocarbons from subterranean hydrocarbon-bearing formations by means of a fireflood is well known to those skilled in the art. Concisely, a fireflood operation is effected by igniting hydrocarbons in a subterranean formation, injecting air through an injection well to sustain the combustion, and producing hydrocarbons freed by the heat of combustion from a production well. Combustion product gases are also produced from a production well. When the subterranean hydrocarbon-bearing formation also contains sulphur compounds, $H_2S$ is sometimes formed and produced as part of the combustion product gases from the production well.

$H_2S$ is known to be a highly toxic gas. Safety, environmental concern and governmental regulations prohibit the release of this hydrogen sulfide into the atmosphere. Thus, the combustion product gases from the subterranean formation must often be treated in some manner to remove the $H_2S$ therefrom prior to exhausting into the atmosphere.

The Claus reaction is well known to those skilled in the art whereby $H_2S$ is reacted with oxygen to form elemental sulphur. This process is widely employed to remove $H_2S$ from gaseous streams bearing the $H_2S$ with the concurrent recovery of elemental sulphur.

There is a distinct need in the oil industry for means to recover additional hydrocarbons after primary recovery operations are no longer feasible. There is also a considerable need for processes which mitigate environmental pollution when fireflood operations are employed to recover hydrocarbons from subsurface formations which contain hydrocarbons and sulphur compounds.

OBJECTS OF THE INVENTION

An object of the invention is to provide a process for the removal of $H_2S$ from combustion product gases resulting from a subterranean fireflood operation.

It is a further object of the present invention to recover sulphur from subterranean combustion product gases phoduced from a fireflooding operation.

These and other objects and advantages of the present invention will be apparent to those skilled in the art from the reading of the detailed description given hereinafter and the appended claims.

SUMMARY OF THE INVENTION

According to the instant invention, it is discovered that in the production of hydrocarbons from a hydrocarbon-bearing subsurface formation wherein combustion of hydrocarbons is effected in the formation, air to sustain the combustion is injected through an injection well, the air injected to sustain the combustion is compressed by a compressor driven by a combustion engine, and in situ combustion product gases are produced from a production well; and wherein $H_2S$ is sometimes produced as part of the combustion product gases from the production well; that an improvement comprising: (a) passing an oxygen-containing gas in heat exchange relationship with the exhaust gases from the combustion engine employed to power the compressor to heat the oxygen-containing gas to a temperature at least sufficient to react with $H_2S$, and (b) passing the oxygen-containing gas thus heated into contact with the $H_2S$ containing combustion product gases from the production well at a temperature sufficient that the oxygen reacts with the $H_2S$ to form elemental sulphur and thus remove the $H_2S$, constitutes a significant improvement in such fireflood operations, and satisfies a need of the industry.

BRIEF DESCRIPTION OF THE DRAWING

The instant invention may be more readily understood by referral to the accompanying drawing in which an oxygen-containing gas is passed in heat exchange relationship with the exhaust gases from the combustion engine employed to power the compressor to heat the oxygen-containing gas, and then passing the oxygen-containing gas thus heated into contact with the $H_2S$ containing combustion product gases from the production well within a catalytic bed with the resultant mitigation of pollution of the atmosphere with $H_2S$ and the recovery of elemental sulphur.

DESCRIPTION OF THE PREFERRED EMBODIMENT

It has now been discovered that heat from the compressor driving engine used in a fireflood operation can be employed to heat an oxygen-containing gas to a sufficient temperature that contacting of the thus heated gas with $H_2S$ containing combustion product gases from the fireflood operation results in a Claus reaction which converts the $H_2S$ in the fireflood combustion product gases to sulphur. The sulphur is readily recoverable. Considerable conservation of energy is obtianed.

The process of the instant invention may be more readily understood by referral to the accompanying figure.

In the figure, an injection well 105 is cased and completed through cement completion 104 from the earth's surface 101 through overburden 102 into subterranean reservoir 103 which contains a viscous crude oil. Perforations 106, for example, are provided in order to permit air 131 injected from compressor 130 connected through well head tubing 129 into reservoir 103. The injected air forms an air bank 107 within the formation supplying oxygen for sustaining the combustion front 108 burning the residual oil 109 remaining after primary and/or secondary oil recovery. Residual oil 109 and noxious production gases resulting from the in situ combustion fireflooding of the reservoir 103 are produced through production well 110, cased and completed by cement 111, from wellhead 112 and are passed to and separated in a gas-liquid separator 113 to yield recovered liquid 115 from the lower section of the gas-liquid separator 113 and $H_2S$ containing combustion product gases from the gas outlet 114 located in the upper portion of the gas-liquid separator.

The $H_2S$ containing combustion product gases are introduced into a catalytic reactor 116 through inlet 150. The catalytic reactor contains a catalyst to promote the reaction of $H_2S$ with oxygen to produce sulphur and water vapor. The catalyst can also be effective to promote the conversion of CO and oxygen to form $CO_2$. A stack gas of water vapor, nitrogen, and carbon dioxide 118 is produced from the exhaust stack 117 of the catalytic reactor 116. The catalyst of the catalytic reactor is continuously recirculated and regenerated for the removal of sulphur. This is accomplished by removing the catalyst from the lower portion of the catalytic reactor 116 through exit 119, passing the catalytic material through the pump 120 and introducing it into a sulphur recovery unit 121 into which steam 122 is introduced. Water and elemental sulphur 124 are produced through exit line 125 controlled by valve 123. Regenerated catalyst 132 is then reintroduced into the upper portion of the catalytic reactor 116 through entry 154.

Also charged to the catalytic reactor through entry 155 via line 126 entirely insulated by insulating covering 156 is an oxygen-containing gas.

The oxygen-containing gas which is charged to catalytic reactor 116 through entry 155 is taken from high-pressure air line 129. The air from high-pressure air line 129 is passed via line 153 through control valve 157 in heat exchange relationship with combustion engine 151 via line 126 to catalytic reactor 118. Combustion engine 151 drives compressor 130 by means of drive-shaft 152. Exhaust gases 128 are exhausted from combustion engine 151 by way of exhaust pipe 160. Valve 158 can be opened if desired to pass exhaust gases through line 159 into line 126 and thence to reactor 116. The system including line 160 an 126 are enclosed by insulative jacket 156 to conserve heat.

A control system provides for optimum heat control in the reactor 116 as well as optimum oxygen content for most efficient reaction of oxygen with $H_2S$ and CO in the $H_2S$ containing combustion product gases from the production well. Thus, temperature and $H_2S$ plus CO content sensors 161 are connected to controller 162 which automatically activates valve 157 controlling the amount of air fed to the reactor, and valves 163 and 166 which control the temperature of air passed to the reactor 116 through entry 155. Valves 163 and 166 control the amount of oxygen-containing gas passing through shunt 164 and heat radiator 165 thus controlling the temperature of oxygen-containing gas passing to the reactor 116 through entry 155, and thus the reaction temperature in the catalytic reactor 116.

The Claus process for the reaction of $H_2S$ and oxygen to form sulphur plus $H_2O$ is well known to those skilled in the art, and can be represented as follows:

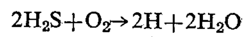

$$2H_2S+O_2 \rightarrow 2H+2H_2O$$

Suitable catalysts, temperatures, residence times and the like to optimally carry out this conversion are also well known to those skilled in the art. Normally, temperature should be about 425° F. and about one mole of oxygen per two moles of $H_2S$ should be employed.

The conversion of carbon monoxide and oxygen to form carbon dioxide is also well known to those skilled in the art as are catalysts for carrying out this conversion and reaction conditions to be employed.

Means for sensing the $H_2S$ content or the CO content of a gaseous stream are also well known to those skilled in the art as are control devices for employing sensing of concentrations of CO and $H_2S$ to optimize the amount of oxygen charged to a reactor for optimum conversion.

Sensors and control devices to control the temperature of a reactor by sensing its temperature and then controlling the temperature of gases entering the reactor are also well known to those skilled in the art. Any of such sensing and controlling devices known to the art can be employed according to the process of this invention.

Means for heat exchange of the heat given off by a combustion engine with an oxygen-containing gas passed thereover are well known to those skilled in the art. For example, the oxygen-containing gas can be passed around the manifold of an internal combustion engine.

The combustion engine employed according to the process of this invention to power the compressor can be any conventional combustion engine such as a gas turbine, a diesel engine, a spark-ignited reciprocating internal combustion engine, a Wankel engine or the like. Such engines are well known to those skilled in the art.

The following exemplification of the process of this invention is provided to help promote a better understanding thereof, but should not be construed as limiting the invention in any manner.

A combustion product gas from a fireflood operation is comprised largely of nitrogen and carbon dioxide. However, the combustion product gas contains up to 10,000 parts per million $H_2S$ and 150,000 to 180,000 parts per million carbon dioxide. This combustion product gas which is derived from a fireflood operation after separation of produced hydrocarbons therefrom is passed to a catalytic reactor containing a catalyst. Catalyst is circulated from the reactor to a separator wherein the produced sulphur is removed therefrom, and is then returning to the catalytic reactor. The temperature of the catalytic reactor is maintained at about 425° F. by charging thereto a heated air stream in an amount such that about one mole of oxygen is provided for each two moles of $H_2S$ plus sufficient oxygen to stoichiometrically react with the carbon monoxide present to form carbon dioxide. The heated air stream is provided by passage over the manifold of a natural gas fired reciprocating internal combustion engine employed to drive the compressor which injects air into the fireflood operation. A portion of the injected air stream is bled off and passed over the manifold of the internal combustion engine to provide the heated air stream passed to the catalytic reactor. In some casse it may be desirable to mix the compressor engine exhaust gases directly with the produced formation gases within the reactor or at some point prior to the gases entering the reactor. Further, the oxygen containing gas necessary to complete the reaction can be introduced into the reactor by auxiliary equipment if for some reason it is not desirable to bleed a portion of the injection air stream into the reactor. Additional heating of the catalytic reactor can also be applied by other means, if desired. The gaseous effluent from the catalytic reactor is substantially freed of $H_2S$ and CO. Pollution is greatly abated, and valuable sulphur is recovered from the process.

Therefore, the present invention is well adapted to carry out the objects and attain the instant advantages mentioned as well as those inherent therein. While presently preferred embodiments of the invention have been given for purposes of disclosure, numerous changes will readily suggest themselves to those skilled in the art which are encompassed within the spirit of this invention and within the scope of the appended claims.

What is claimed is:

1. In the production of hydrocarbons from a hydrocarbon-bearing subsurface formation wherein combustion of hydrocarbons is effected in the formation, air to sustain the combustion is injected through an injection well, the air injected to sustain the combustion is compressed by a compressor driven by a combustion engine, and in situ combustion product gases are produced from a production well; wherein $H_2S$ is produced as part of the in situ combustion product gases from the combustion well; the improvement comprising:

a. passing an oxygen-containing gas in heat exchange relationship with the combustion engine employed to power the compressor to heat the oxygen-containing gas to a temperature at least sufficient to react with $H_2S$, and b. passing the oxygen-containing gas thus heated into conduct with the $H_2S$ containing in situ combustion product gases from the production well at a temperature sufficient that the oxygen reacts with the $H_2S$ to form elemental sulphur and thus remove the $H_2S$.

2. The process of Claim 1 wherein the elemental sulphur thus formed is recovered from the combustion product gas.

3. The process of Claim 1 wherein the combustion engine is an internal combustion engine.

4. The process of Claim 1 wherein the combustion engine is a spark-ignited internal combustion engine.

5. The process of Claim 1 wherein the engine exhaust comprises at least part of the oxygen-containing gas which is reacted with the $H_2S$.

6. The process of Claim 1 wherein air is the oxygen-containing gas.

7. The process of Claim 6 wherein the elemental sulphur thus formed is recovered from the combustion product gas.

8. The process of Claim 7 wherein the combustion engine is an internal combustion engine.

9. The process of Claim 8 wherein the combustion engine is a spark-ignited internal combustion engine.

10. The process of Claim 8 wherein the combustion engine is a diesel engine.

References Cited

UNITED STATES PATENTS

| | | | |
|---|---|---|---|
| 2,969,226 | 1/1961 | Huntington | 166—261 |
| 3,645,551 | 2/1972 | Thompson | 423—567 X |

G. O. PETERS, Primary Examiner

U.S. Cl. X.R.

166—257, 267